3,406,182
1,4,5,6,7,7-HEXABROMO-N-(ETHYLMERCURI)-5-NORBORNENE-2,3-DICARBOXIMIDE

Louis P. Wilks, Chicago, Ill., assignor to Velsicol Chemical Corporation, Chicago, Ill., a corporation of Illinois
No Drawing. Filed Apr. 18, 1966, Ser. No. 543,009
1 Claim. (Cl. 260—326)

ABSTRACT OF THE DISCLOSURE

The compound 1,4,5,6,7,7-hexabromo-N-(ethylmercuri)-5-norbornene-2,3-dicarboximide and its use as a fungicide and nematocide.

---

This invention relates to new fungicidal and nematocidal compositions of matter. More particularly, this invention relates to a new compound having the following planar structural formula:

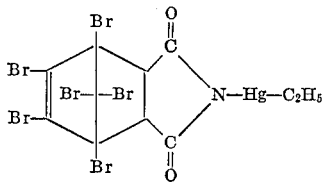

This new compound can be named according to several accepted systems of nomenclature. The name 1,4,5,6,7,7-hexabromo-N-(ethylmercuri) - 5 - norbornene-2,3-dicarboximide will be used herein. Other names for the above new compound are: N-ethylmercuri-1,2,3,6-tetrahydro-3,6-endomethano-3,4,5,6,7,7-hexabromophthalimide; 1,4,5,6,7,7-hexabromo - N - (ethylmercuri) - bicyclo[2.2.1]hept-5-ene-2,3-dicarboximide; and ethyl(1,4,5,6,7,7-hexabromo-5-norbornene-2,3-dicarboximido)-mercury.

Unexpectedly it has been found that the new compound of the present invention possesses remarkable fungicidal and nematocidal activity. Moreover, the new compound of the present invention has higher than expected fungicidal activity on a molar basis. This means that the same result can be obtained with a substantially lower amount of the new compound on a molar basis than with the compound 1,4,5,6,7,7 - hexachloro-N-(ethylmercuri)-5-norbornene-2,3-dicarboximide. Accordingly substantially less mercury is required by using the compound of the present invention, thereby reducing the expense and hazard accompanying the use of large quantities of mercury. It is this combination of unexpected fungicidal and nematocidal activities which makes this new compound unusually valuable in the control of agricultural and industrial pests.

The new compound of the present invention can be prepared readily from the Diels-Alder adduct of hexabromocyclopentadiene and maleic anhydride. The adduct can be treated with ammonia to form a half amide-half ammonium salt and the latter compound pyrolized to form the imide. Alternatively the aduct can be treated with ammonium hydroxide to form the half amide-half ammonium salt with some of the imide being directly produced. The imide can be treated with an alkali metal hydroxide to form the alkali metal salt of the imide. The salt of the imide is then reacted with an ethyl mercury compound, such as ethyl mercury chloride, ethyl mercury bromide, ethyl mercury acetate, and the like, to form the desired compound of the present invention.

The preparation of the new compound of the present invention will be more readily understood from the following examples which are presented by way of illustration:

Example 1.—Preparation of the Diels-Alder adduct of hexabromocyclopentadiene and maleic anhydride Maleic anhydride (114 g.; 1.16 moles) and toluene (100 ml.) were placed into a 2-liter, three-necked, round-bottom flask fitted with a mechanical stirrer, reflux condenser and internal thermometer. The mixture was heated with stirring until homogeneous. Solid hexabromocyclopentadiene (540 g.; 1 mol) was added to the refluxing mixture over a period of 30 minutes. The resulting mixture was stirred and heated at reflux for an additional 2 hours. Upon cooling, a solid precipitated from the reaction mixture and was filtered, washed with pentane and thoroughly dried in vacuo to yield the desired adduct as a pale, off-white solid. The aduct thus formed can be used for many purposes as such or can be purified by dissolving in hot benzene, treating with activated charcoal, filtering and precipitating from solution by cooling and/or adding a relative non-solvent liquid such as hexane.

Example 2.—Prepartion of 1,4,5,6,7,7-hexabromo-5-norbornene-2,3-dicarboximide

Adduct of hexabromocyclopentadiene and maleic anhydride (60 g.; 0.094 mol), prepared as described in the previous example, was suspended in 28% aqueous ammonium hydroxide (600 ml.) and heated on a steam bath with frequent stirring to control foaming. After the cessation of foaming and dissolution of almost all of the solid, acetone, (30 ml.) was added and the heating continued until a dark yellow-orange solution was obtained. The solution was cooled to room temperature. A light yellow precipitate was filtered from the solution, triturated with acetone, and the undissolved solid residue (A) dried in the air. The acetone washings from the trituration were combined and heated under vacuum to yield a solid residue (B). The aqueous filtrate from the reaction mixture was also heated under vacuum to yield a yellow solid residue (C).

The three solid residues (A), (B), and (C), obtained above, were combined and placed into a 250 ml., round-bottom flask. The contents of the flask were placed in vacuo and heated to 240–250° C. for a period of 2½ hours during which time ammonia was evolved. The flask was allowed to cool and the black solid residue was dissolved in acetone. The resulting solution was treated twice by boiling with powdered charcoal and filtering, and then was filtered while hot through a bed of diatomaceous earth filter-aid. The filtrate was heated in vacuo to remove the acetone and yield a light yellow solid residue. The residue was triturated with a minimum amount of benzene, washed with pentane and dried in a desiccator in vacuo, to yeld the desired 1,4,5,6,7,7-hexabromo-5-norbornene-2,3-dicarboximide as a white solid decomposing above 250° C.

Example 3.—Preparation of N-potassium-1,4,5,6,7,7-hexabromo-5-norbornene-2,3-dicarboximide 1,4,5,6,7,7-hexabromo-5-norbornene-2,3-dicarboximide (37.4 g.; 0.059 mol), prepared in Example 2, was suspended in absolute methanol (200 ml.) and the suspension placed into a 500 ml., three-necked, round-bottom flask fitted with a mechanical stirrer and reflux condenser. A solution of 90% potassium hydroxide (3.7 g.; 0.059 mol) in absolute methanol (25 ml.) was added to the contents of the flask resulting in a clear reaction mixture. The reaction mixture was stirrer and heated at reflux temperature for 2½ hours during which a white solid precipitated from solution. The reaction mixture was cooled and filtered. The filtered solid was washed twice with ether and dried to yield N-potassium-1,4,5,6,7,7-hexabromo-5-norbornene-2,3-dicarboximide as a white solid.

Example 4.—Preparation of 1,4,5,6,7,7-hexabromo-N-(ethylmercuri)-5-norbornene-2,3-dicarboximide N-potassium-1,4,5,6,7,7 - hexabromo - 5 - norbornene-2,3-dicarboximide (10.0 g.; 0.015 mol), prepared in the previous example, and absolute ethanol (150 ml.) were placed in a 500 ml. three-necked, round-bottom flask equipped with a mechanical stirrer and reflux condenser. A warm solution of ethyl mercury bromide (4.6 g.; 0.015 mol) in absolute ethanol (150 ml.) was added to the stirred contents of the flask. The reaction mixture was stirred and heated at reflux for about 16 hours. The reaction mixture was cooled to room temperature and filtered and the filtrate diluted with an equal volume of water. The solid which precipitated was filtered and dried in a vacuum desiccator. The product was treated with a minimum of hot ethanol. The suspension was cooled and filtered, and the solid product dried in a desiccator under reduced pressure to yield 1,4,5,6,7,7-hexabromo-N-(ethylmercuri)-5-norbornene-2,3-dicarboximide as a light brown solid which melts 166–168° C. with decomposition, and has the following elemental analysis as calculated for $C_{11}H_7Br_6HgNO_2$:

Theoretical: Br, 55.42%; N, 1.62%. Found: Br, 54.74%; N, 1.59%.

For practical use as a fungicide and/or a nematocide, the compound of this invention is generally incorporated into a pesticidal composition which comprises an inert carrier and a fungicidally and/or nematocidally toxic amount of the compound. Such pesticidal compositions, which can also be called formulations, enable the active compound to be applied conveniently to the site of the pest infestation in any desired quantity. These compositions can be solids such as dusts, granules, or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

The active compound is sufficiently soluble in common organic solvents such as kerosene or xylene so that it can be used directly as a solution in these solvents. Frequently, solutions of pesticides can be dispersed under superatmospheric pressure as aerosols. However, preferred liquid pesticidal compositions are emulsifiable concentrates, which comprise the active compound according to this invention and as the inert carrier, a solvent and an emulsifier. Such emulsifiable concentrates can be extended with water and/or oil to any desired concentration of active compound for application as sprays to the site of the pest infestation. The emulsifiers most commonly used in these concentrates are nonionic or mixtures of nonionic with anionic surface-active agents.

A typical insecticidal composition according to this invention is illustrated by the following example, in which the quantities are in parts by weight.

Example 5.—Preparation of a dust

Product of Example 4 _____ 10
Powdered talc _____ 90

The above ingredients are mixed in a mechanical grinder-blender and are ground until a homogeneous, free-flowing dust of the desired particle size is obtained. This dust is suitable for direct application to the site of the pest infestation.

The compound of this invention can be applied as a fungicide or a nematocide in any manner recognized by the art. One method for destroying fungus and nematode pests comprises applying to the locus of the pest infestation, a pesticidal composition comprising an inert carrier and as the essential active ingredient, in a quantity which is toxic to said pests, the compound of the present invention. The concentration of the new compound of this invention in the pesticidal compositions will vary greatly with the type of formulation and the purpose for which it is designed, but generally the compositions will comprise from about 0.05 to about 95 percent by weight of the active compound of this invention. In a preferred embodiment of this invention, the compositions will comprise from about 5 to about 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with other fungicidal and nematocidal chemical compounds to form pesticidal compositions useful for the control of fungi and soil nematodes. Typical examples of such fungicidal chemical compounds are ferbam, nabam, zineb, ziram, thiram, chloranil, dichlone, glyodin, and the like; while examples of nematocidal compounds are chloropicrin, tetrachlorothiophene, diazomet, dibromochloropropane, and the like.

The new compound of this invention is fungicidal in its ability to kill, inhibit or inactivate a fungus so that it does not grow. Practically, this compound can be used to prevent fungi and molds from harming cloth, wood, plants, animals, or whatever else they attack. The fungicidal compound should preferably be applied before the infection has occurred and certainly before it has progressed very far.

When the compound of this invention is used as an agricultural fungicide, it can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber, cereal leaf rust on wheat, and such common soil fungi as fusarium wilt (*Fusarium oxysporum*), the seed rot fungus (*Phythium debaranum*), and the sheath and culm blight (*Rhizoctonia solani*). The new compound of this invention can also be employed as an industrial fungicide to control a variety of fungi which attack such materials as adhesives, cork, paints, lacquers, leather, wood, plastics, and textiles such as cotton and wool.

The quantity of active compound of this invention to be used for good disease control will depend on a variety of factors, such as the particular disease involved, the intensity of the infestation, formulation, weather, type of crop and the like. Thus, while the application of only one or two ounces of active compound per acre of a crop may be sufficient to control a light infestation of certain fungi, a pound or more of active compound per acre may be required to control a heavy infestation of a hardy species of fungus.

The utility of the compound of this invention as a fungicide was illustrated by experiments carried out for the control of fungi. In a typical experiment the compound to be tested was dissolved in a suitable solvent, such as acetone, containing a small amount of nonionic surface active agent, such as polyoxyalkylene derivatives of sorbitan monolaurate and/or monooleate. The mixture was then dispersed in water to form test solutions containing 1000 p.p.m. actual compound. Susceptible species of wheat were grown in soil in plastic pots with about 25 plants per pot. After the wheat plants were 7 days old, they were sprayed with the test solutions containing 1000 p.p.m. actual compound, with two to three pots used for each treatment. After the sprays had dried, the plants were inoculated with wheat leaf rust, (*Puccinia rubigo-vera*), by dusting its uredospores over the plants. After 8 days, the extent of the disease was observed and rated in comparison with untreated controls. The product of Example 4 was found to provide 98% control as a protectant leaf spray.

The fungicidal utility of the compound of this invention was also illustrated by experiments carried out for the control of sheath and culm blight (*Rhizoctonia solani*) and fusarium wilt (*Fusarium oxysporum*). In these experiments soil is inoculated with the fungus organism which was growing on wheat-lima bean medium for 14 days. The inoculated soil was placed in 1 ounce paper cups, and the surface drenched with the test chemical, formulated as heretofore described at the indicated rates. After 2–4 days, the growth of the fungus on the surface of the soil was measured and rated in comparison with untreated controls.

The results of these experiments are presented below:

| Test Compound | Dosage, lbs. per 4-inch acre | Control, percent | |
|---|---|---|---|
| | | Rhizoctonia solani | Fusarium oxysporum |
| 1,4,5,6,7,7-hexabromo-N-(ethylmercuri)-5-norbornene-2,3-dicarboximide | 4 | 23.3 | 93.3 |
| Do | 10 | 100.0 | 96.0 |
| Do | 16 | 100.0 | 93.7 |
| Do | 40 | 100.0 | 100.0 |
| Do | 100 | 100.0 | 100.0 |

The compound of the present invention is also useful in controlling nematodes. Nematodes are tiny worms which cause extensive damage to many important commercial plants. Although they can attack any part of the plant, most species limit their attack to the roots or other underground parts. They injure plants by direct feeding, by causing root loss and general stunting, and in an indirect manner by injuring the tissues and making the plants more susceptible to fungus diseases. The presently known control measures include crop rotation, other cultural practices, and soil treatment with chemicals; but none of these methods has been fully satisfactory. Indeed, such important nematode species as the wheat nematode, the stem and bulb nematode, the burrowing nematode, the root nematode, the citrus nematode, the sugar beet nematode, the root knot nematode, the meadow nematode, the potato rot nematode, and the golden nematode continue to cause heavy damage to many economic crops. An effective means for the control of such nematodes is therefore highly desirable.

The toxicity of the compound of the present invention to nematodes can be shown by a variety of testing techniques known to the art. For example, in one series of tests, the compound was tested for control of the root knot nematode (Meloidogyne spp.) on tomato plants. The nematodes were reared by blending a part of a 2–3-month old culture of the nematodes with sieved soil (⅛-inch sieve) and sand in a mixer. The infested soil mixture was placed in 4-inch plastic pots and manually compacted. The compound of the present invention was dissolved in a solvent, such as acetone containing emulsifiers, diluted with water to 100 ml. and drenched on the surface of the soil in each pot, giving a concentration of 100 pounds of chemical per 4-inch acre. The pots were placed in a greenhouse and held for seven days, after which time, 10–14 day old Bonny Best tomato seedlings were transplanted to the soil mixture in each pot. After at least two weeks, control of the nematode was evaluated by comparing the number of galls on the roots of the plants in the treated soil mixture with the number of galls on plants growing in infested, but untreated soil mixture. The compound of the present invention provided 99.1% control of the root knot nematode at the above concentration. The plants in the untreated pots contained an average of 22.2 galls per plant.

The nematocidal activity of the compound of the present invention was also demonstrated in another test for the control of root knot nematode on tomato plants. Nematode infested soil and sand mixture (630 ml.), prepared as described above, was placed into a plastic bag. The test solution of the compound of the present invention in acetone containing emulsifiers was prepared as above and pipetted into each bag. The solution and soil mixture in each bag was mixed and the bag placed in an incubator in the dark at 75° F. for 7–10 days. Thereafter the treated soil mixture was transferred to 4-inch plastic pots which were placed in a greenhouse for seven days. The soil mixture in the pots were watered daily. After the seven day period, 10–14 day old Bonny Best tomato seedlings were transplanted to the soil mixture in each pot. The control of the root knot nematode was determined after at least two weeks by comparing the number of galls on the roots of the plants growing in the treated soil mixture with the number of galls on the roots of plants growing in infested and incubated, but otherwise untreated, soil mixture. The compound of the present invention provided 100% control of the root knot nematode at the above concentration. The plants in the untreated pots contained an average of 26.4 galls per plant.

I claim:

1. 1,4,5,6,7,7 - hexabromo - N - (ethylmercuri)-5-norbornene-2,3-dicarboximide.

References Cited

UNITED STATES PATENTS

| 3,340,273 | 9/1967 | Hayes | 260—326 |
| 3,280,143 | 10/1966 | Hayes | 260—326 |
| 2,781,360 | 2/1957 | Kleiman | 260—326 |
| 2,697,101 | 12/1954 | Kleiman | 260—326 |
| 2,598,562 | 5/1952 | Kleiman | 260—326 |
| 2,781,360 | 2/1957 | Kleiman | 260—326 |

NICHOLAS S. RIZZO, *Primary Examiner.*

J. A. NARCAVAGE, *Assistant Examiner.*